United States Patent [19]

Seki

[11] Patent Number: 5,217,528
[45] Date of Patent: Jun. 8, 1993

[54] NON-ASBESTOS FRICTION MATERIAL

[75] Inventor: Katsuji Seki, Washinomiya, Japan

[73] Assignees: Akebono Brake Industry Co., Ltd., Tokyo; Akebono Research and Development Centre Ltd., Hanyu, both of Japan

[21] Appl. No.: 779,255

[22] Filed: Oct. 18, 1991

[30] Foreign Application Priority Data

Nov. 28, 1990 [JP] Japan .................. 2-328257

[51] Int. Cl.$^5$ .................. C09K 3/14
[52] U.S. Cl. .................. 106/36; 106/417; 106/DIG. 3
[58] Field of Search .................. 106/36, 417, DIG. 3

[56] References Cited

U.S. PATENT DOCUMENTS

| | | | |
|---|---|---|---|
| 2,865,426 | 12/1958 | Heyman | 106/417 |
| 3,342,617 | 9/1967 | Jackson | 106/417 |
| 4,273,699 | 6/1981 | Chester | 523/153 |
| 4,310,452 | 1/1982 | Chester | 523/155 |
| 4,373,038 | 2/1983 | Moraw et al. | 523/156 |
| 4,384,054 | 5/1983 | Moraw et al. | 106/36 |
| 4,438,004 | 3/1984 | Myers | 106/36 |
| 4,537,636 | 8/1985 | Bernhard et al. | 106/DIG. 3 |
| 5,009,711 | 4/1991 | Emmert et al. | 106/417 |
| 5,022,923 | 6/1991 | Rau et al. | 106/417 |
| 5,049,191 | 9/1991 | Pflug et al. | 106/36 |
| 5,091,011 | 2/1992 | DeLuca, Jr. | 106/417 |

FOREIGN PATENT DOCUMENTS 0198420 10/1986 European Pat. Off.
785615 10/1957 United Kingdom.

OTHER PUBLICATIONS

World Patents Index Latest, 83-760951, & JP-A-5-8-130-160, Aug. 3, 1983, "Inorganic Bind Preparation Mica Plate Contain Phosphorus Penta Oxide Sodium Oxide Alumina Boron Oxide".
World Patents Index Latest, 87-331387, & JP-A-6-2-237-127, Oct. 17, 1987, "Friction Material Brake Clutch Made Metal Fibre Inorganic Organic Fibre Organic Inorganic Bind Fill".
World Patents Index Latest, 90-213271, & JP-A-2-14-2-881, May 31, 1990, "Friction Material Brake Pad Aluminum Phosphate Bind Carbon Particle Aggregate".

Primary Examiner—Mark L. Bell
Assistant Examiner—Helene Klemanski
Attorney, Agent, or Firm—Oblon, Spivak, McClelland, Maier & Neustadt

[57] ABSTRACT

A non-asbestos friction material comprising mica powder adhered with aluminum phosphate and then subjected to the heating treatment, friction modifier and thermosetting resin binder is disclosed. The material is used for the brake lining and clutch facing for cars and industrial machinery.

12 Claims, 1 Drawing Sheet

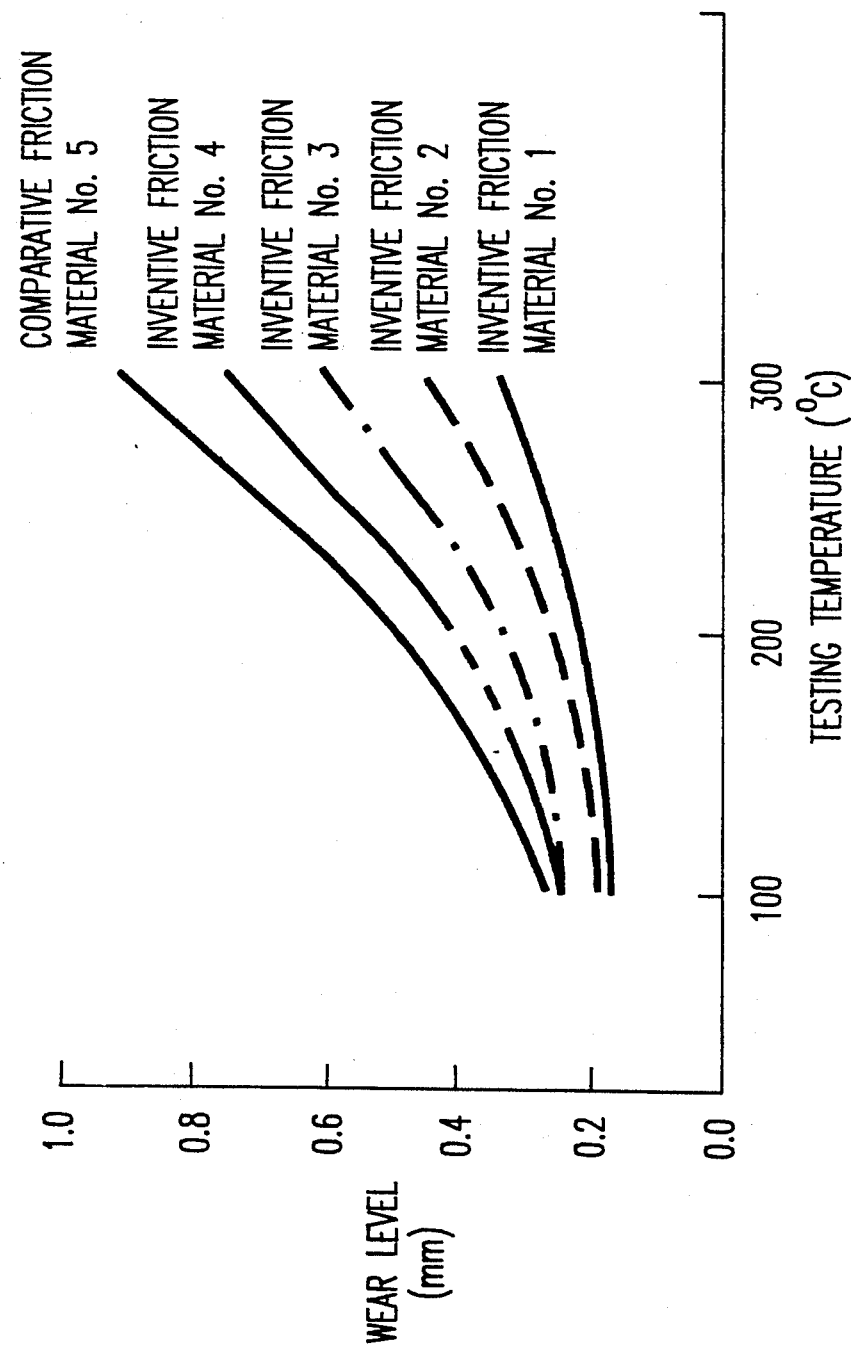

NON-ASBESTOS FRICTION MATERIAL

BACKGROUND OF THE INVENTION

The present invention relates to a non-asbestos friction material used for the brake lining and clutch facing for cars and industrial machinery.

So far, as a basic material of friction material for the brake lining and clutch facing, asbestos useful as a heat-resistant reinforcing material has been used. However, from the pollution problem due to asbestos dust, friction materials without asbestos have become to be put into practice.

Here, from the studies on said dust, it is known that the problem of dust lies particularly in the shape thereof and that the thinner the diameter of needle-like shape of fibers used as reinforcing material, the more harmful.

After diligent studies to solve this problem, the inventors paid attention to the use of mica as a base material of friction material in the invention. As well known, however, mica is a stratified compound and has a low interlayer strength. Hence, when it is used for the friction material of brakes for cars running at high speed or industrial machinery heavily loaded, it became clear that mica caused interlayer splitting during braking to increase the wear.

There, as a result of further investigations, a non-asbestos friction material has been developed according to the invention, in which the interlayer splitting of mica is prevented and which is good in wear resistance and durable against high speed and heavy load.

SUMMARY OF THE INVENTION

The invention is characterized as comprising mica powder coated with aluminum phosphate and then subjected to a heating treatment for 1 to 3 hours at a temperature of 150° to 1500° C., a friction modifier and a thermosetting resin binder.

BRIEF DESCRIPTION OF THE DRAWING

FIG. 1 is a chart showing the wear level by temperature of various friction materials used in the examples.

DETAILED DESCRIPTION OF THE INVENTION

The reason why aluminum phosphate is adhered to mica powder in this way is because the interlayer and surrounding strength of mica can be improved. As a result, it becomes possible to decrease the high-temperature wear of a friction material containing this. Moreover, the reason of giving heating treatment is for preventing from the hindrance of the curing reaction of thermosetting resin by strongly acidic aluminum phosphate.

For increasing said interlayer strength, the weight of aluminum phosphate is preferable to be 3 to 10% to mica powder. After said weight of aluminum phosphate was adhered to a required weight of mica powder, the curing reaction is carried out under heat within a temperature range of 150° to 1500° C., preferably 500° to 1200° C., to increase the interlayer and surrounding strength. Thereafter, it is only necessary to pulverize to adjust the particle size within a range of 0.5 to 5 mm.

In following, the examples of the invention will be illustrated.

EXAMPLE

The inventive friction materials No. 1 through No. 4, wherein usual basic formulation of friction material, "20 to 40 wt. % of inorganic filler, 5 to 20 wt. % of organic friction dust, 5 to 15 wt. % of metal powder, 5 to 15 wt. % of lubricant, 0 to 5 wt. % of organic reinforcing fibers and 10 to 15 wt. % of thermosetting resin", was obtained by mixing and further adequate levels of mica powder having increased the interlayer strength by adhering aluminum phosphate and being subjected to the heating treatment for 2 hours at 800° C. were formulated as shown in Table 1 making the total amount 100 wt. %, and the comparative friction material No. 5, wherein mica powder without aluminum phosphate adhered was formulated making the total amount 100 wt. %, were molded. Of these, the wear level on constant velocity test was investigated by temperature, the results of which are shown in FIG. 1.

TABLE 1

| Item | Material | Inventive friction material No. 1 | Inventive friction material No. 2 | Inventive friction material No. 3 | Inventive friction material No. 4 | Comparative friction material No. 5 |
|---|---|---|---|---|---|---|
| Thermosetting resin | Phenol resin | 13 wt % | 13 wt % | 13 wt % | 13 wt % | 13 wt % |
| Inorganic filler | Barium sulfate | 30 | 20 | 10 | 40 | 30 |
| Friction dust | Cashew dust | 8 | 8 | 8 | 8 | 8 |
|  | Rubber dust | 5 | 5 | 5 | 5 | 5 |
| Lubricant | Graphite | 10 | 10 | 10 | 10 | 10 |
| Metal powder | Copper powder | 10 | 10 | 10 | 10 | 10 |
| Organic fibers | Aramid fibers | 3 | 3 | 3 | 3 | 3 |
| Mica powder with aluminum phosphate adhered |  | 21 | 31 | 41 | 11 | — |
| Mica powder without aluminum phosphate adhered |  | — | — | — | — | 21 |

From FIG. 1, it can be clearly seen that the inventive friction materials show decreased wear over the comparative friction material. Further, too much or too little formulation level of the mica with aluminum phosphate adhered has less effect particularly on the wear at high temperature. The adequate level is 2 to 50 wt. % and the optimal level 5 to 45 wt. %.

As described, in accordance with the invention, conspicuous effects that, by using mica powder adhered with aluminum phosphate and then subjected to the heating treatment, non-asbestos friction material can be put into practice, further this friction material shows decreased wear particularly at high temperature, and the like are exerted.

What is claimed is:

1. A non-asbestos containing friction material comprising, in admixture,
   1) mica powder which has been coated with aluminum phosphate and subjected to heat treatment for from 1 to 3 hours at a temperature of from 150° C. to 1500° C.,
2) organic friction dust,
3) inorganic filler,
4) lubricant, and
5) a thermosetting resin.

2. The non-asbestos containing friction material according to claim 1, wherein the weight of aluminum phosphate coated on said mica powder is 3 to 10 wt. % of the mica powder.

3. The non-asbestos containing friction material according to claim 1, wherein the particle size of said mica powder coated with aluminum phosphate and subjected to heat treatment is 0.5 to 5 mm.

4. The non-asbestos containing friction material according to claim 1, wherein said mica powder coated with aluminum phosphate and subjected to heat treatment is present in an amount of 2 to 50 wt. % in the friction material.

5. The non-asbestos containing friction material according to claim 1, wherein said mica powder coated with aluminum phosphate and subjected to heat treatment is present in amounts of 5 to 45 wt. % in the friction material.

6. A non-asbestos containing friction material according to claim 1, further comprising organic reinforcing fibers.

7. A non-asbestos containing friction material according to claim 1, wherein said organic friction dust is selected from the group consisting of cashew dust and rubber dust.

8. A non-asbestos containing friction material according to claim 1, wherein said inorganic filler comprises barium sulfate and copper powder.

9. A non-asbestos containing friction material according to claim 1 wherein said lubricant is graphite.

10. A non-asbestos containing friction material according to claim 1, wherein said thermosetting resin is phenol resin.

11. A non-asbestos containing friction material according to claim 6 wherein said organic reinforcing fibers are aramid fibers.

12. A non-asbestos containing friction material comprising 2 to 50 wt. % of mica powder coated with aluminum phosphate and subjected to heat treatment for from 1 to 3 hours at a temperature of from 150° C. to 1500° C., 25 to 55 wt. % of inorganic filler, 5 to 20 wt. % of organic friction dust, 5 to 15 wt. % of lubricant, 0 to 5 wt. % of organic reinforcing fibers and 10 to 15 wt. % of a thermosetting resin.

* * * * *